US011110742B2

(12) United States Patent
Chenault, III

(10) Patent No.: US 11,110,742 B2
(45) Date of Patent: Sep. 7, 2021

(54) HYBRID WHEEL ASSEMBLY WITH ATTACHMENT PIN

(71) Applicant: Superior Industries International, Inc., Southfield, MI (US)

(72) Inventor: Henry Clay Chenault, III, Fayetteville, AR (US)

(73) Assignee: SUPERIOR INDUSTRIES INTERNATIONAL, INC., Southfield, MI (US)

( * ) Notice: Subject to any disclaimer, the term of this patent is extended or adjusted under 35 U.S.C. 154(b) by 187 days.

(21) Appl. No.: 16/126,551

(22) Filed: Sep. 10, 2018

(65) Prior Publication Data

US 2019/0135032 A1   May 9, 2019

Related U.S. Application Data

(60) Provisional application No. 62/555,969, filed on Sep. 8, 2017.

(51) Int. Cl.
*B60B 23/08*   (2006.01)
*B60B 3/04*   (2006.01)
(Continued)

(52) U.S. Cl.
CPC ............. *B60B 23/08* (2013.01); *B60B 3/02* (2013.01); *B60B 3/041* (2013.01); *B60B 3/10* (2013.01);
(Continued)

(58) Field of Classification Search
CPC ......... B60B 3/041; B60B 3/044; B60B 3/045; B60B 3/047; B60B 23/06; B60B 23/08;
(Continued)

(56) References Cited

U.S. PATENT DOCUMENTS 2,840,422 A   6/1958   Main et al.
3,346,301 A   10/1967   Hurst et al.
(Continued)

FOREIGN PATENT DOCUMENTS

CH   710074 A2 *   3/2016   ............. B60B 3/045
DE   3904009 A1   8/1990
(Continued)

OTHER PUBLICATIONS

Japanese Office Action dated Aug. 21, 2019.
International Search Report for PCT/US2018/50198 dated Jan. 31, 2019.

*Primary Examiner* — Kip T Kotter
(74) *Attorney, Agent, or Firm* — Gregory D. DeGrazia; Miller, Canfield, Paddock & Stone, PLC

(57) ABSTRACT

A wheel assembly for a vehicle includes a face portion and a rim portion. The face portion is formed from an alloy and defines a plurality of spokes extending radially outwardly between a central portion and a proximal bead element. The rim portion is formed of a composite material that defines an annular wall extending between the proximal bead element and a distal bead element. The face portion defines a mating member that is disposed in mating engagement with a rim seat defined by the rim portion. The mating member and the rim seat define a receptor for receiving a pin with said pin including shear resistors oriented to counteract shear forces F between said face portion and the rim portion.

11 Claims, 5 Drawing Sheets

(51) Int. Cl.
 *B60B 3/10* (2006.01)
 *B60B 3/02* (2006.01)
(52) U.S. Cl.
 CPC ... *B60B 2310/316* (2013.01); *B60B 2310/318* (2013.01); *B60B 2360/10* (2013.01); *B60B 2360/104* (2013.01); *B60B 2360/106* (2013.01); *B60B 2360/108* (2013.01); *B60B 2360/341* (2013.01); *B60B 2900/111* (2013.01); *B60B 2900/112* (2013.01)
(58) Field of Classification Search
 CPC .............. B60B 23/10; B60B 2310/318; B60B 2360/104; B60B 2360/106; B60B 2360/108; B60B 2360/341; B60B 2900/111; B60B 2900/112
 See application file for complete search history.

(56) References Cited

U.S. PATENT DOCUMENTS

| | | | |
|---|---|---|---|
| 3,612,614 A | 10/1971 | Ware | |
| 4,909,690 A * | 3/1990 | Gapp | B29C 70/202 |
| | | | 411/411 |
| 4,982,998 A | 1/1991 | Mikawa | |
| 4,997,235 A | 3/1991 | Braungart | |
| 5,018,566 A | 5/1991 | Thoni | |
| 5,275,471 A | 1/1994 | Nutzmann | |
| 5,282,673 A | 2/1994 | Koyama et al. | |
| 5,435,629 A | 7/1995 | Suzuki | |
| 5,549,360 A | 8/1996 | Lipeles | |
| 5,803,553 A | 9/1998 | Wei | |
| 5,899,538 A | 5/1999 | Tatraux-Paro et al. | |
| 6,598,939 B2 | 7/2003 | Müller | |
| 6,754,957 B2 | 6/2004 | Coleman et al. | |
| 6,763,865 B1 | 7/2004 | Bernoni | |
| 7,059,685 B2 | 6/2006 | Kermelk et al. | |
| 7,464,995 B2 | 12/2008 | Csapo et al. | |
| 7,530,644 B2 | 5/2009 | Hodges | |
| 7,918,513 B2 | 4/2011 | Wilson | |
| 8,757,732 B2 | 6/2014 | Kermelk et al. | |
| 8,914,977 B2 | 12/2014 | Furukawa et al. | |
| 8,919,890 B2 | 12/2014 | Anca et al. | |
| 9,340,066 B2 | 5/2016 | Mueller et al. | |
| 9,539,855 B2 | 1/2017 | Werner et al. | |
| 9,573,414 B2 | 2/2017 | Huidekoper | |
| 9,586,366 B2 | 3/2017 | Werner et al. | |
| 9,616,621 B2 | 4/2017 | Werner et al. | |
| 9,616,704 B2 | 4/2017 | Werner et al. | |
| 9,701,158 B2 | 7/2017 | Pellicano et al. | |
| 9,895,926 B2 | 2/2018 | Huidekoper | |
| 2002/0017818 A1* | 2/2002 | Muller | B60B 25/002 |
| | | | 301/11.1 |
| 2004/0032161 A1* | 2/2004 | Smyth | B60B 3/005 |
| | | | 301/9.1 |
| 2004/0227392 A1* | 11/2004 | Coleman | B21D 53/26 |
| | | | 301/64.101 |
| 2005/0062238 A1 | 3/2005 | Vernet et al. | |
| 2008/0164750 A1 | 7/2008 | Vanetta | |
| 2012/0043014 A1 | 2/2012 | Seong et al. | |
| 2015/0273934 A1* | 10/2015 | Huidekoper | B60B 3/045 |
| | | | 301/11.1 |
| 2015/0352897 A1* | 12/2015 | Huidekoper | B60B 23/08 |
| | | | 301/11.1 |
| 2016/0311252 A1* | 10/2016 | Werner | B60B 3/041 |
| 2016/0318335 A1* | 11/2016 | Werner | B60B 3/04 |
| 2016/0325582 A1* | 11/2016 | Werner | B60B 5/02 |
| 2017/0087929 A1 | 3/2017 | Walls-Bruck et al. | |
| 2017/0217249 A1 | 8/2017 | Chenault et al. | |
| 2017/0253077 A1* | 9/2017 | Werner | B60B 23/10 |
| 2017/0297368 A1 | 10/2017 | Pellicano et al. | |
| 2017/0314604 A1 | 11/2017 | Werner et al. | |
| 2017/0315604 A1* | 11/2017 | Aiba | G06F 1/3293 |
| 2017/0334240 A1* | 11/2017 | Renner | B60B 23/06 |
| 2019/0193461 A1* | 6/2019 | Xue | B60B 27/0047 |

FOREIGN PATENT DOCUMENTS

| | | | |
|---|---|---|---|
| DE | 4123459 C1 * | 11/1992 | ............. B60B 23/10 |
| DE | 202015101529 U1 * | 4/2015 | ............. B60B 23/10 |
| EP | 96399 A2 | 12/1983 | |
| EP | 315897 A2 | 5/1989 | |
| FR | 1189762 A | 10/1959 | |
| FR | 7930834 A1 | 6/1981 | |
| FR | 2580550 A1 | 10/1986 | |
| GB | 767953 A | 2/1957 | |
| JP | H03193501 A | 8/1991 | |
| WO | 9301946 A1 | 2/1993 | |
| WO | 2010067383 A1 | 6/2010 | |
| WO | 2014058313 A1 | 4/2014 | |
| WO | 2014129900 A1 | 8/2014 | |
| WO | 2015069111 A1 | 5/2015 | |
| WO | 2015082790 A1 | 6/2015 | |
| WO | 2015090276 A1 | 6/2015 | |
| WO | 2015106760 A1 | 7/2015 | |
| WO | 2016014920 A1 | 1/2016 | |
| WO | 2017174248 A1 | 10/2017 | |
| WO | 2017174445 A1 | 10/2017 | |

\* cited by examiner

HYBRID WHEEL ASSEMBLY WITH ATTACHMENT PIN

PRIOR APPLICATIONS

The present application claims priority to U.S. Provisional Patent Application No. 62/555,969 filed on Sep. 8, 2018, the contents of which are included herein by reference.

TECHNICAL FIELD

The present application relates generally toward lightweight vehicle wheels having a composite rim. More specifically, the present invention relates toward a lightweight vehicle wheel assembly having a composite rim portion and an alloy face portion with an enhanced attachment configuration.

BACKGROUND

Cast alloy wheels have been in use on automobiles designed for road use and other vehicles designed for off-road use for many years. Cast alloys such as, for example, aluminum magnesium and titanium have provided desirable appearance while also providing reduced mass over old style steel wheels that require hubcaps for providing desirable appearance. Continuously increasing fuel efficiency standards have put pressure on vehicle manufacturers to continuously reduce mass, even on vehicle components already providing low mass, such as, for example, cast alloy wheels.

It is believed that hybrid alloy-composite wheels provide the most efficient reduction of mass while also providing a traditionally desirable appearance of an alloy wheel. For a variety of reasons, hybrid alloy-cast wheels have not gained wide acceptance in high volumes on mass produced vehicles. One such reason wide acceptance has not been achieved is due to concerns related to the durability of a joint defined between a metallic alloy face portion of the wheel to a composite rim portion of the wheel.

Various attempts at designing components to adjoin the metallic alloy face portion with a composite rim portion of the wheel have been disclosed. The use of screws and bolts has been contemplated for securing an alloy face to a composite rim. However, none of these efforts appear sufficient with respect to both durability and ease of manufacturing. In addition, the use of heavy mechanical fasteners, such as screws nuts and bolts add mass back to the wheel that has been eliminated by way of the composite rim. In addition, because these hybrid wheels have not yet been widely commercialized, and in many cases not even been prototyped, viable solutions for adjoining a metallic alloy face portion with a composite rim portion have yet to be validated. Therefore, it would be desirable to provide a low-cost, lightweight solution to adjoin the face portion with the rim portion to assure integrity of the hybrid wheel assembly.

SUMMARY

A wheel assembly for a vehicle includes a face portion and a rim portion. The face portion is formed from an alloy defining a plurality of spokes extending radially outwardly between a central portion and a proximal bead element. The rim portion is formed of a composite material defining an annular wall and extending between the proximal bead element and a distal bead element. The face portion defines a mating member that is affixed to a seat defined by the rim portion. The mating member and the seat define a receptor for receiving a pin with the pin including shear resistors oriented to counteract shear forces F between the face portion and the rim portion.

The applicant of the invention of the present application has made significant enhancements toward weight reduction and stiffness of vehicle wheels. For example, U.S. Pat. No. 9,815,323 filed on Jul. 22, 2015 and co-pending U.S. patent application Ser. No. 14/805,999 disclosing unique wheel structure for reducing mass and increasing stiffness, the contents of both of which are incorporated herein by reference. Co-pending U.S. patent application Ser. No. 15/422,627, the contents also of which are incorporated herein by reference, discloses hybrid wheels incorporating composite rims and alloy face portions providing further weight savings. In keeping with the significant mas reductions of these inventions, present invention provides an attachment between a composite rim and an alloy face of wheel that is even more robust and lower mass than the prior art that makes use of heavy fasteners. The use of a reinforced composite pin oriented to counteract shear forces F while eliminating the labor intensive process of screwing fasteners together solve the problems associated with the use of mechanical fasteners such as screws, nuts and bolts.

BRIEF DESCRIPTION OF THE DRAWINGS

Other advantages of the present invention will be readily appreciated as the same becomes better understood by reference to the following detailed description when considered in connection with the accompanied drawings, wherein.

DETAILED DESCRIPTION

Figure 1:
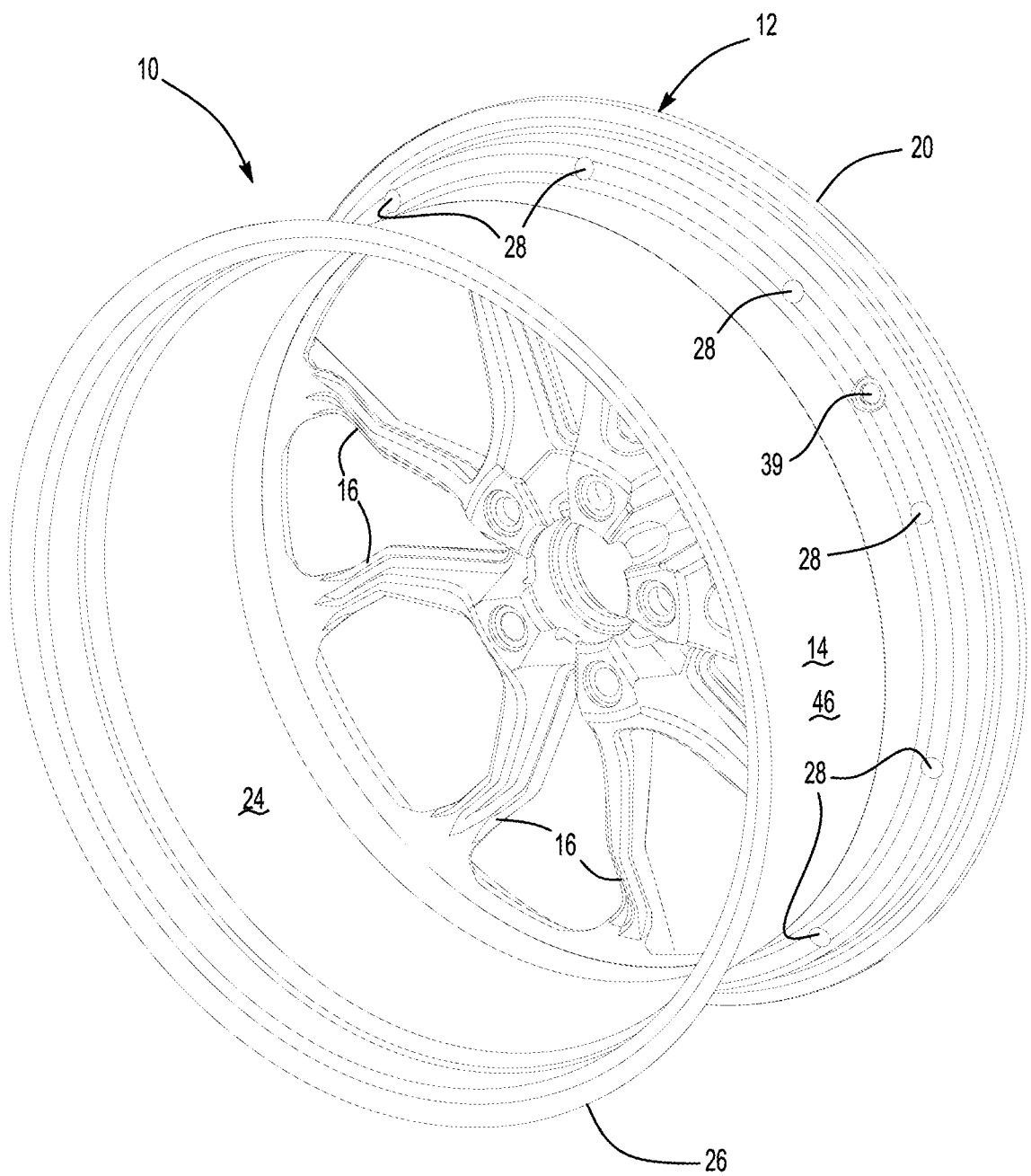
FIG. 1 shows a perspective view of a wheel of the present invention.
Figure 2:
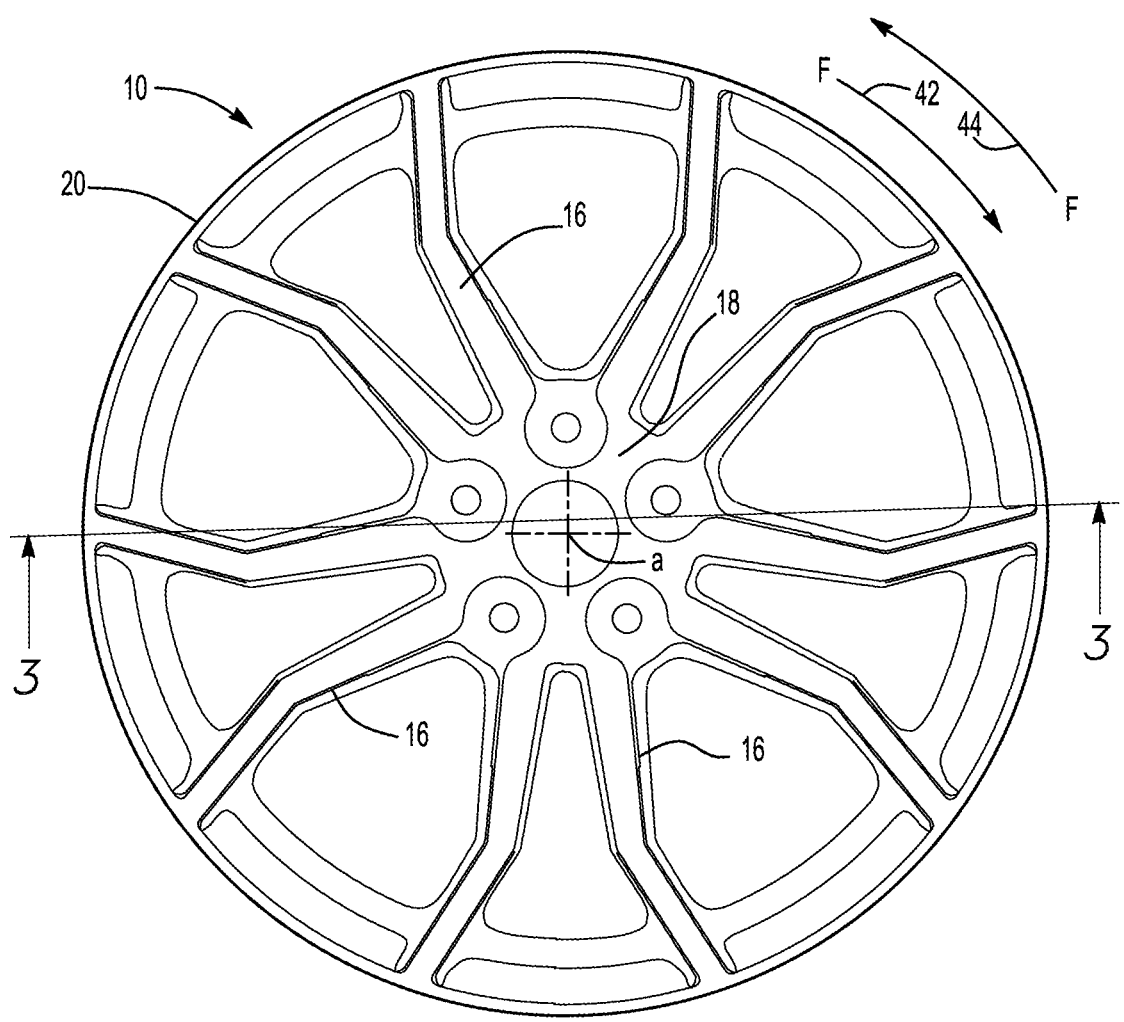
FIG. 2 shows a plan view of the face portion of the wheel.
Figure 3A:
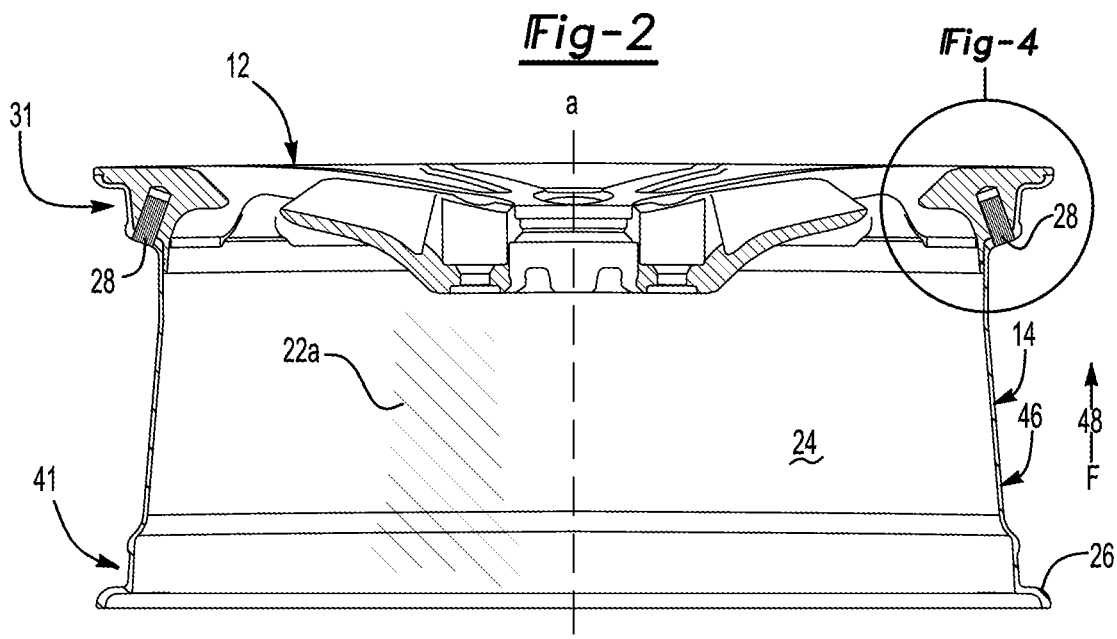
FIG. 3 shows a side sectional view of the wheel.
Figure 3B:
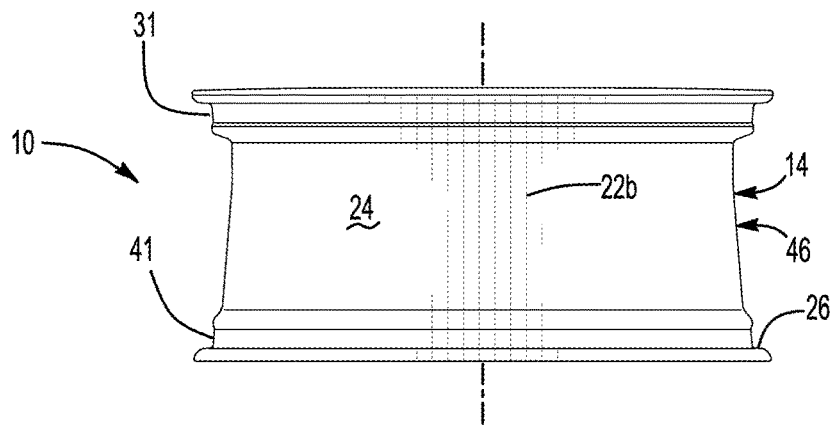
Figure 3C:
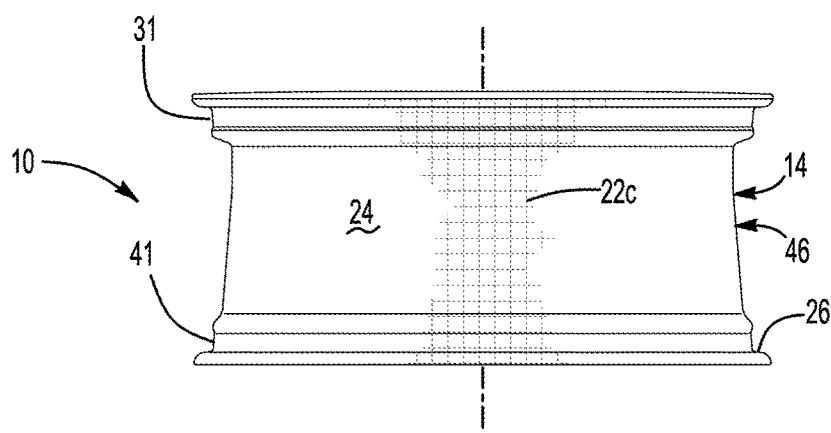
Figure 3D:
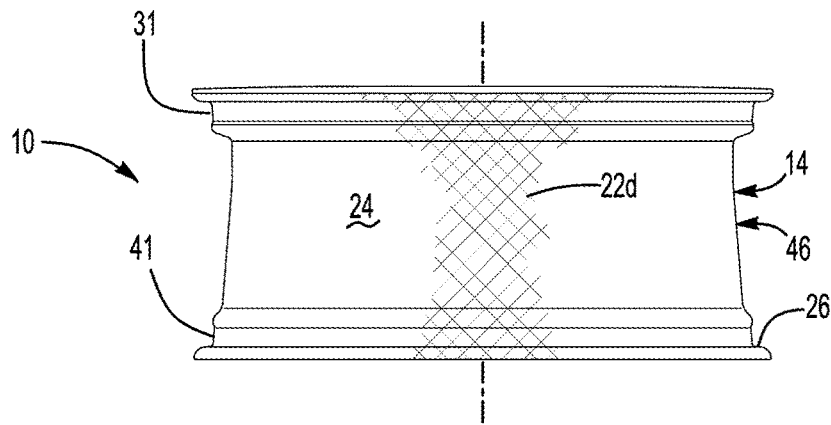
Figure 3E:
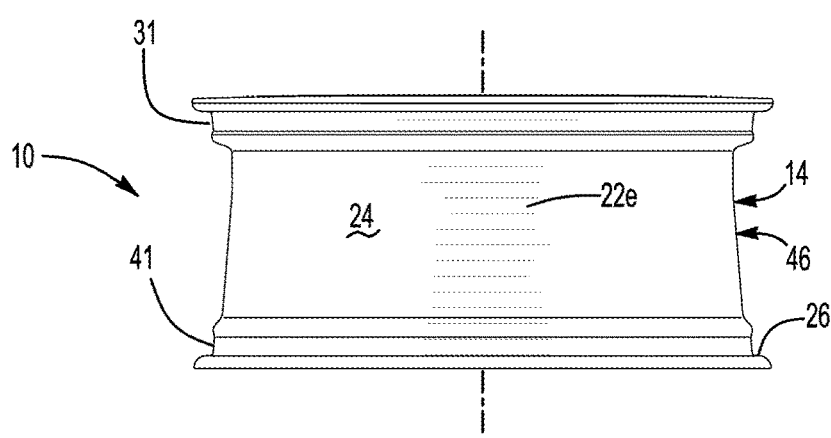

Referring to FIGS. 1 and 2, the hybrid wheel of the present invention is generally shown at 10. The wheel 10 includes a face portion 12 and a rim portion 14. In one embodiment, the face portion 12 is formed from a metallic alloy. The alloy is molten and injected into a die cavity of a die (not shown) for casting the face portion 12. The face portion 12 may also be machined or milled to a desired geometric configuration to achieve desired appearance and performance characteristics. In a still further embodiment, the face portion 12 may also be stamped or forged.

The face portion 12 includes a plurality of spokes 16 that extend between a central portion 18 and a proximal bead element 20. The proximal bead element 20 circumscribes a wheel axis a (FIG. 2) and interconnects each of the plurality of spokes 16. It should be understood that the face portion 12 can be cast or formed from a variety of different alloys, which include, but are not limited to an aluminum alloy, a magnesium alloy, a titanium alloy, and the like.

The rim portion 14 is formed from a composite polymer reinforced by fibers 22 (FIG. 3) as will be explained further herein below. In one embodiment, polyphenylene sulfide is a carrier resin used to form the rim portion. In alternative embodiments, the polymer carrier resin includes urethane, TPP, or other equivalent polymer carriers capable of providing performance requirements desirable of the rim portion 14 of the wheel 10.

As best shown in FIG. 3, the composite binder is infused with fibers 22 to improve stiffness and strength of the rim portion 14. The fibers 22 include a plurality of different orientations providing localized strength where desired. As shown at 22a of FIG. 3, the fibers are impregnated in an annular wall 24 that extends between the proximal bead 20 and a distal bead element 26 at an angle to the wheel axis a. Alternatively, the fibers are oriented parallel to the axis a as represented at 22b of FIG. 3. The fiber orientations include interwoven fibers generating a crosswise orientation as represented at 22c. It should also be understood that the fibers 22 are also infused in the carrier resin in the distal bead element 26 as shown at 22d, providing stiffening properties to the distal bead element 26 the purpose of which will become more evident herein below. Still further, as shown at 22e the fibers are oriented in the annular wall 24 perpendicular to the axis a thereby circumscribing the axis a.

It should be understood to those of ordinary skill in the art that multiple configurations or orientations of the fibers 22 provide localized stiffening only where necessary. Limited use of the fibers 22 only where required reduces both cost and mass of the rim portion 14. It is further contemplated that the fibers 22 are contained in a tape, strip, or ply (not shown) and laid over a mandrel or onto a die surface and later enclosed in a die cavity into which the carrier resin is injected to define the rim portion 14. Alternatively, the tape, strip, and ply are an impregnated thermoplastic that may be reformed to net shape without after being overlaid onto a mandrel. The fiber 22 is selected from glass fiber, carbon fiber, nylon fiber, carbon nanofiber such as graphene and the like.

Figure 4:
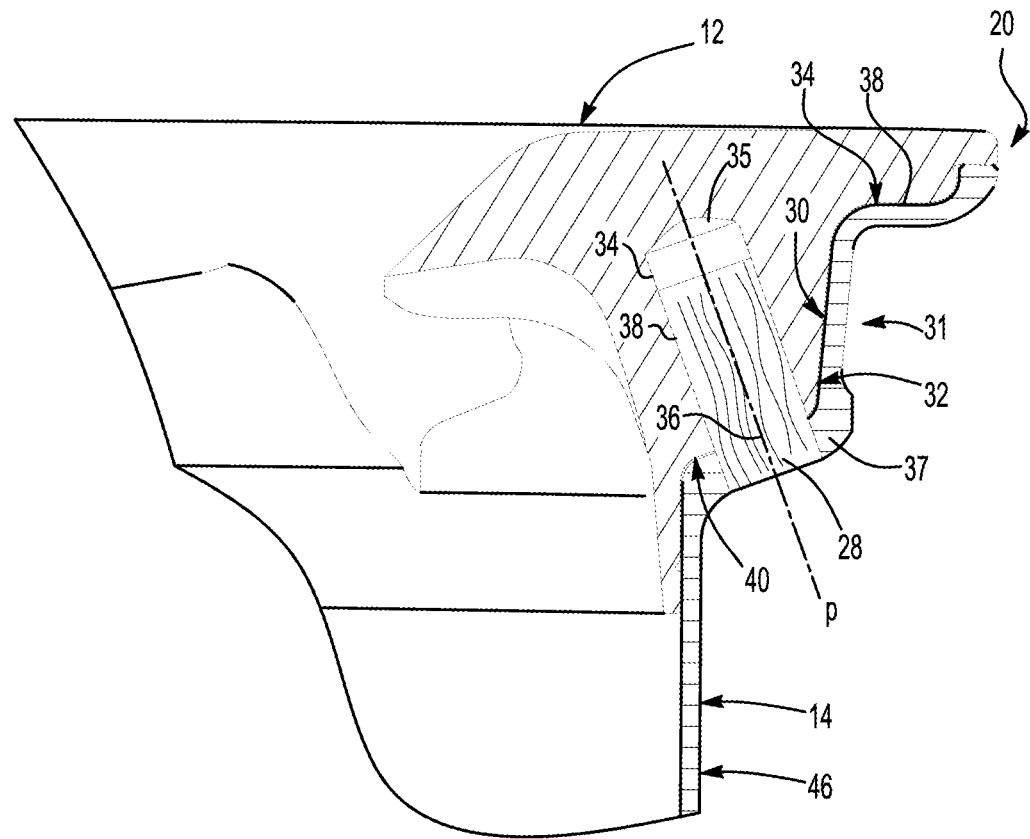
FIG. 4 shows an expanded sectional view of the pin inserted into the receptor.

As best seen in FIG. 4, a cross-sectional view of the proximal bead element 20 is shown with a pin 28 interconnecting the face portion 12 and the rim portion 14. The face portion 12 defines a mating member 30 that is disposed in mating engagement with a rim seat 32 defined by the rim portion 14. The rim portion 14 extends to the proximal bead element 20 and defines a proximal bead seat 31 that seals to a tire bead (not shown) when a tire is mated to the wheel 10. A distal bead seat 41 is located at the distal bead element 26 and is formed entirely of composite material.

In one embodiment, the mating member 30 is adhered to the rim seat 32 with adhesive 38. In an alternative embodiment, the mating member 30 is interlocked to the rim seat 32 by way of an interference fit or mechanical engagement. Further, a combination of engagement is also within the scope of this invention. After the face portion 12 is mated to the rim portion 14, a valve stem aperture 39 is formed as a bore machined through both the face portion 12 and the rim portion 14.

Once the face portion 12 is attached to the rim portion 14, a receptor 34 is formed in the mating member 30 of the rim portion 14 and the rim seat 32 of the face portion 12. The receptor 34 is drilled or machined through the mating member 30 into the rim seat 32. While the receptor 34 is drilled entirely through the mating member 30 of the rim portion 14, the receptor 34 does not pierce the rim seat 32 of the face portion 32 but terminates at a base 35, the reason of which will become more evident herein below. The mating member 30 includes a mating wall 37 proximate the receptor 30 that is thicker than the rest of the rim portion 14 to provide increased contact surface area between the rim portion 12 and the pin 28.

The pin 28 includes a near net outer diameter to an inner diameter of the receptor 34 to provide a frictional engagement. The pin 28 is formed from an impregnated composite material. Pin fibers 36 impregnate the pin 28 and are oriented parallel to a pin axis p. As with the rim portion 14, the pin fibers 36 include glass fiber, carbon fiber, nylon fiber, carbon nanofiber such as graphene. The pin 28 is inserted into the receptor 34. Adhesive 38 is included to prevent the pin 28 from working free from the receptor 34 when the wheel 10 is in service. To avoid adverse chemical reaction, the adhesive used to adhere the pin 28 to the receptor 34 is the same adhesive as used to adhere the mating member 30 to the of the rim portion 14 and the rim seat 32 of the face portion 12. In addition, the adhesive 38 is non-corrosive to the alloy used to form the face portion 12.

A seam 40 defined between the mating member 30 and the rim seat 32 is likely subject to shear forces F that could cause the face portion 12 to separate from the rim portion 14. An axle shear force F 42 is directed in an opposite circumferential direction to a tire shear force 44. The axle shear force F 42 is caused by the driving force of a vehicle axle (not shown) while the tire shear force F 44 is caused by friction between a road surface and a tire (not shown). In addition, an axial shear force F 48 is directed axially outwardly from the wheel 10 when the vehicle is turned due to differing wheel speeds primarily accounted for with differential mechanisms. The axle shear force F 42 and the tire shear force 44, absent the concepts of the present invention could cause the face portion 12 to spin relative to the rim portion 14. The axial shear force F 48, absent the concepts of the present invention could cause the face portion 12 to pull away from the rim portion 14.

The pin 34 is oriented so that the pin axis p is perpendicular to the axle shear force 42 and the tire shear force 44. Therefore, the pin fibers 36 disposed in the pin 34 are also perpendicular to the axle shear force 42 and the tire shear force 44. It is believed that the orienting the pin fibers 36 perpendicular to the axle shear force 42 tire shear force 44 provides the most durable orientation because the forces that could cause the face portion 12 to separate from the rim portion 14 are counteracted by the pin fibers 36. The pin axis p intersects the wheel axis a at an acute angle for counteracting the axial shear force 48.

While a single pin 34 and receptor 34 have been described above, it should be understood that a plurality of pins 34 may be used to provide an even more robust wheel 10. The pins 34, in one embodiment are located at the lowest stress area of the wheel. In this embodiment, the lowest stress area of the wheel is proximate the location the spoke 16 contacts the proximal bead element 20. While counterintuitive, the pins 34 provide the most resistance to shear forces F at the low stress area of the wheel.

Figure 5A:
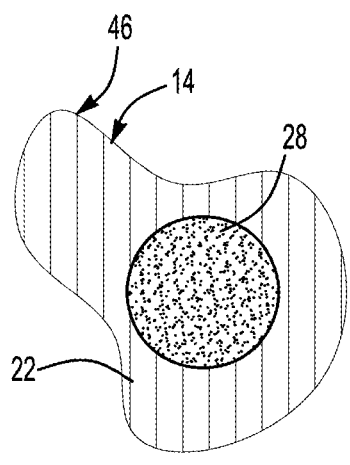
FIGS. 5A-5C show a fiber orientation of the rim portion at the mating base of the mating member.
Figure 5B:
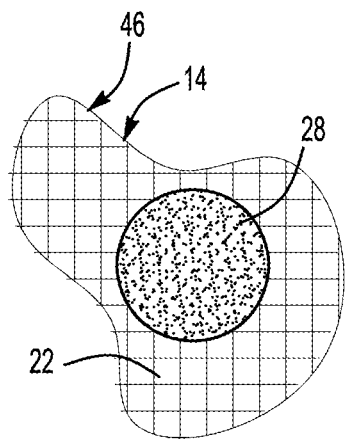
Figure 5C:
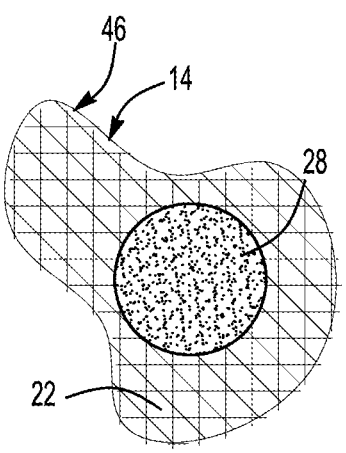
Figure 6:
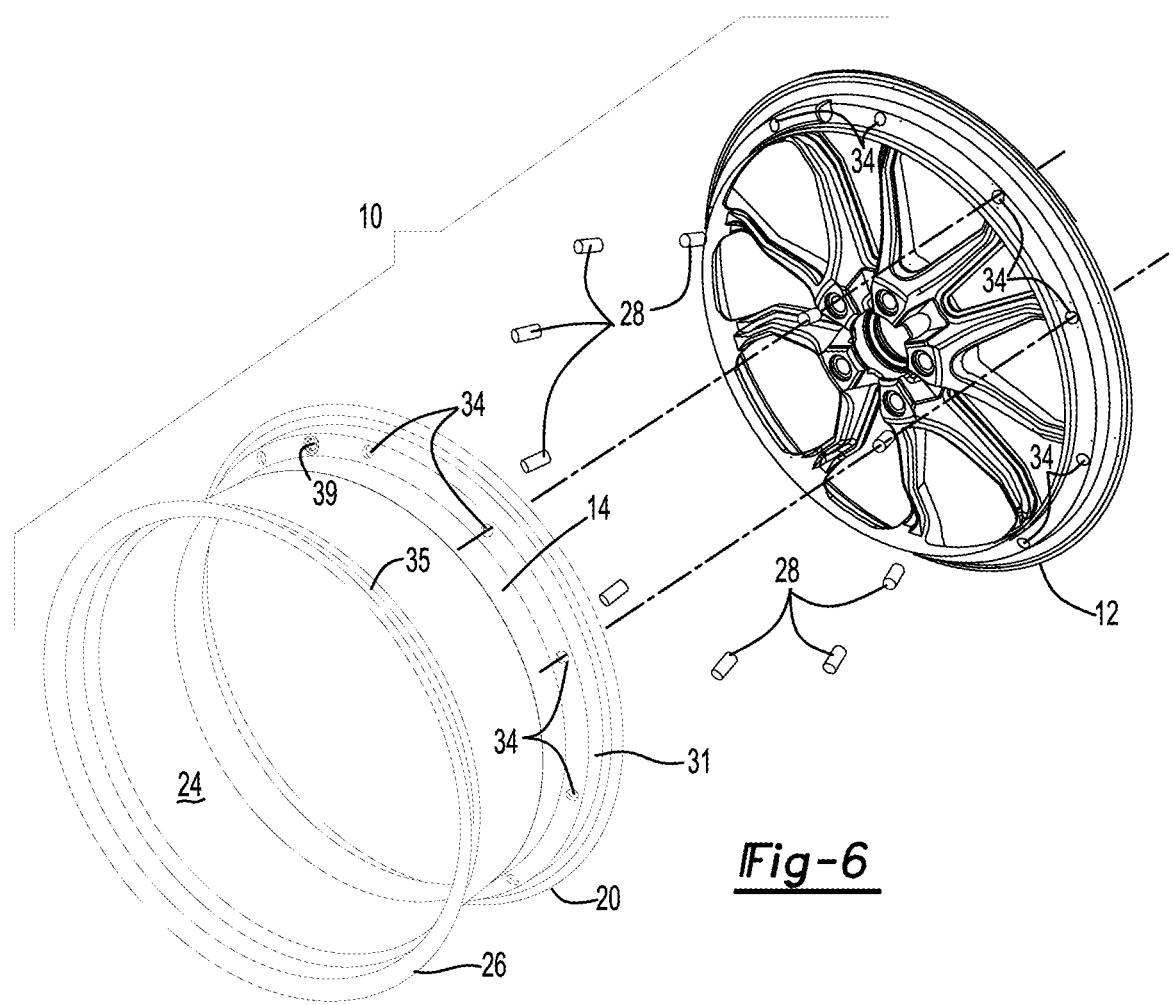
FIG. 6 shows an exploded view of the wheel of the present invention.

As represented in FIG. 5A-5C, an orientation of the fibers 22 are around the pin provide maximum resistance to the shear forces F 42, 44. The ply, tape, or layup of the fibers 22 include a perpendicular orientation to both the shear forces F 42, 44 and the pin axis p. Additional layers of ply, tape or layup orient the fibers 22 at an angle to the shear forces F 42, 44 while still being perpendicular to the pin axis p. Further layers of ply, tape, or layup orient the fibers 22 parallel to the shear forces F 42, 44 and at an angle to the shear forces F 42, 44. Each layer of the ply, tape, or layup provides, if desired, fibers 22 that crisscross at multiple angles.

Referring again to FIG. 4, the pin 28, as set forth above is inserted into the rim portion 14 inside a wheel well 46 defined by the rim portion 14. As also set forth above, the pin 28 is received by the face portion 12, but the receptor 34 does not pierce the face portion 12. The pin 28 and adhesive 38 seal the wheel well 46 preventing pressurized air from escaping when the tire is mated to the wheel 10.

Obviously, many modifications and variations of the present invention are possible in light of the above teachings foregoing invention has been described in accordance with the relevant legal standards; thus, the description is merely exemplary rather than limiting in nature. Variations and modifications to the disclosed embodiment may become apparent to those skilled in the art and do come within the scope of the invention. Accordingly, the scope of the legal protection afforded this invention can only be determined by studying the following claims.

What is claimed is:

1. A wheel assembly for a vehicle, comprising:
    a face portion and a rim portion;
    said face portion being formed from an alloy defining a plurality of spokes extending radially outwardly between a central portion and a proximal bead element;
    said rim portion being formed of a composite material being infused with fibers and defining an annular wall and extending between said proximal bead element and a distal bead element;
    said face portion defining a mating member being disposed in mating engagement with a rim seat defined by said rim portion whereby said mating member and said rim seat generate circumferential shear forces F therebetween; and
    said mating member and said rim seat defining a receptor for receiving a pin with said pin including shear resistors oriented substantially perpendicular to both said fibers infused into said composite material and to the circumferential shear forces F to counteract the circumferential shear forces F generated between said mating member defined by said face portion and said rim seat defined by said rim portion.

2. The wheel assembly set forth in claim 1, wherein said pin defines a pin axis and said shear resistors define fibrous fillers aligned with said pin axis being angularly displaced from circumferential shear forces F between said face portion and said rim portion.

3. The wheel assembly set forth in claim 2, wherein said rim portion is adjoined to said face portion with adhesive.

4. The wheel assembly set forth in claim 3, wherein said pin is retained in said receptor with an adhesive.

5. The wheel assembly set forth in claim 1, wherein said receptor is sealed at one end by said face portion.

6. The wheel assembly set forth in claim 1, wherein said rim portion includes layers of ply having elongated fibrous fillers and said fibrous fillers of each ply are disposed crosswise.

7. The wheel assembly set forth in claim 6, wherein said fibrous fillers are disposed generally perpendicular to said shear resistors disposed in said pin.

8. The wheel assembly set forth in claim 1, wherein said wheel assembly defines a wheel axis and said pin defines a pin axis being disposed at an acute angle to said wheel axis.

9. The wheel assembly set forth in claim 1, wherein said wheel assembly defines low stress locations and said pin is disposed at a low stress location.

10. The wheel assembly set forth in claim 1, wherein said wheel assembly defines tire shear force and axle shear force and said pin axis is disposed at an offset orientation to a direction of both said tire shear force and axle shear force.

11. The wheel assembly set forth in claim 1, wherein said pin comprises a plurality of pins.

* * * * *